J. D. ROBERTSON.
FISHING REEL.
APPLICATION FILED JUNE 8, 1920.
1,386,366.
Patented Aug. 2, 1921.
2 SHEETS—SHEET 1.
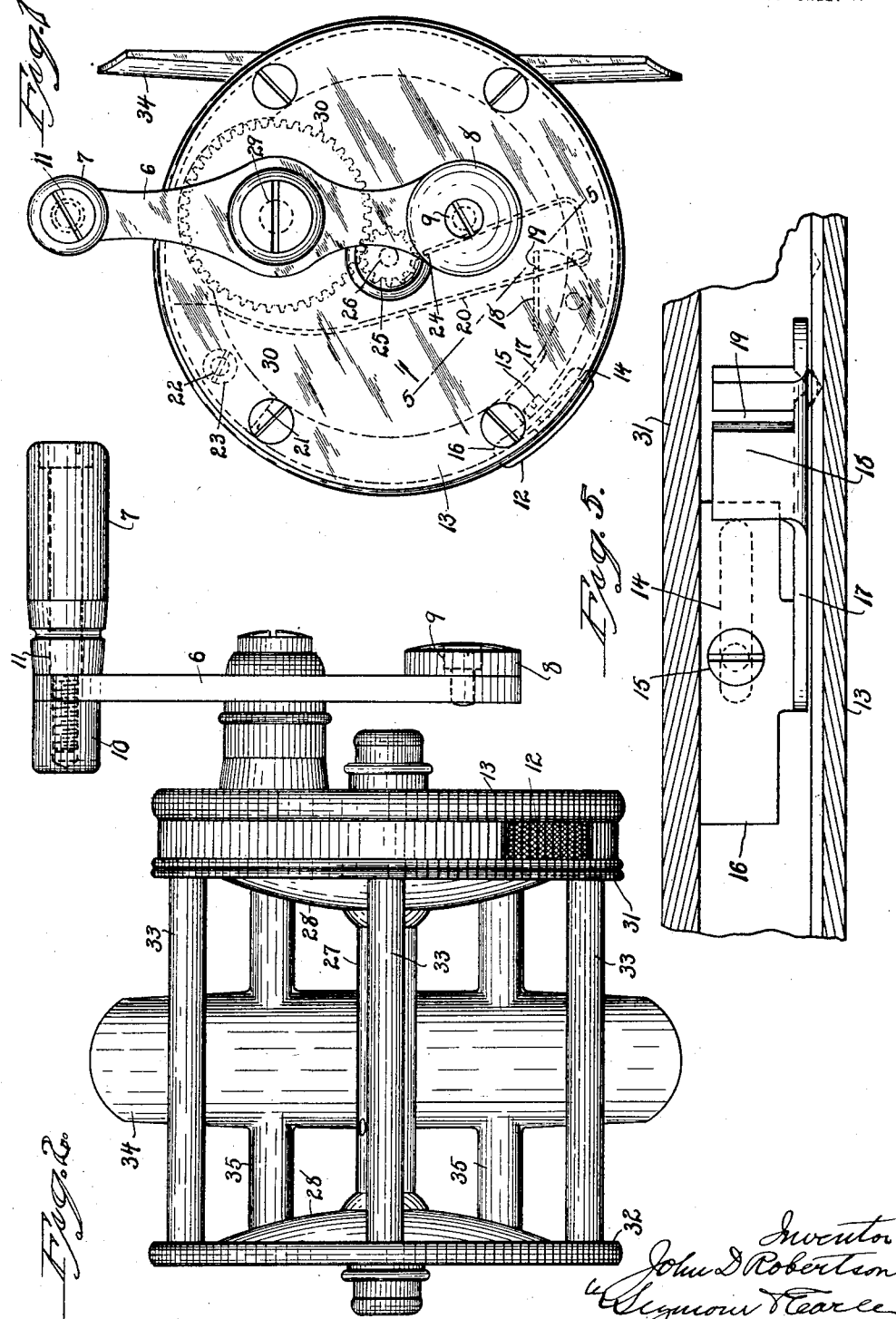

J. D. ROBERTSON.
FISHING REEL.
APPLICATION FILED JUNE 8, 1920.

1,386,366.

Patented Aug. 2, 1921.
2 SHEETS—SHEET 2.

Inventor.
John D Robertson
by Seymour H Carr
Atty

UNITED STATES PATENT OFFICE.

JOHN D. ROBERTSON, OF NEW HAVEN, CONNECTICUT, ASSIGNOR TO WINCHESTER REPEATING ARMS CO., OF NEW HAVEN, CONNECTICUT, A CORPORATION.

FISHING-REEL.

1,386,366.   Specification of Letters Patent.   Patented Aug. 2, 1921.

Application filed June 8, 1920. Serial No. 387,368.

*To all whom it may concern:*

Be it known that I, JOHN D. ROBERTSON, a citizen of the United States, residing at New Haven, in the county of New Haven and State of Connecticut, have invented a new and useful Improvement in Fishing-Reels; and I do hereby declare the following, when taken in connection with the accompanying drawings and the characters of reference marked thereon, to be a full, clear, and exact description of the same, and which said drawings constitute part of this application, and represent, in—

Figure 1, a view in elevation looking toward the handle end of a fishing-reel embodying my invention.

Fig. 2, a plan view of the reel.

Figure 3:
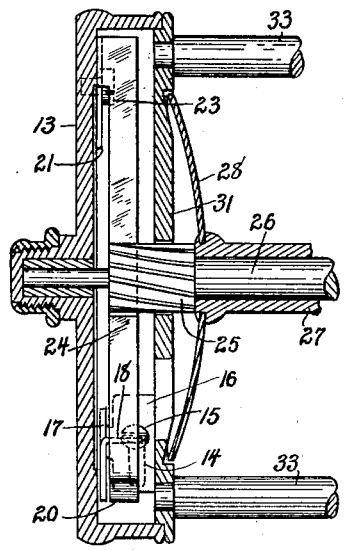

Fig. 3, a broken view partly in elevation and partly in central section showing the disposition of my improved click-spring within the reel-cap.

Figure 4:
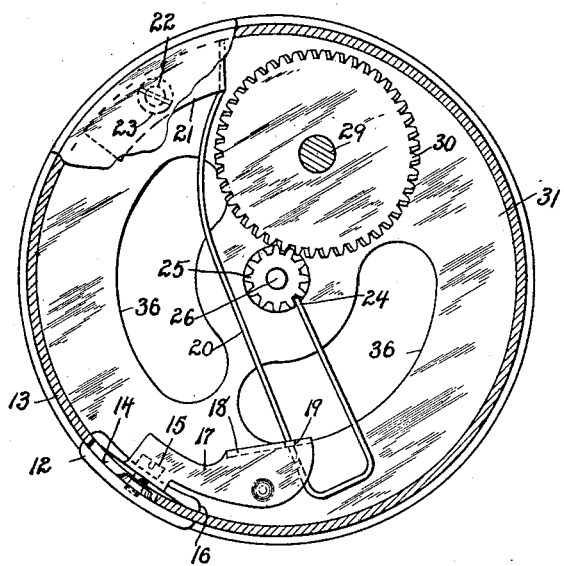

Fig. 4, a view partly in elevation and partly in transverse section, showing the click-spring as mounted, as connected with the thumb-piece, and as engaged with the driven pinion on the spool-shaft.

Fig. 5, an enlarged sectional view on the line 5—5 of Fig. 1.

Figure 6:
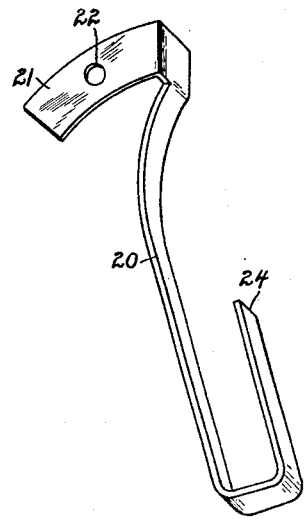

Fig. 6, a detached perspective view of the spring.

My invention relates to an improvement in fishing-reels, the object being to improve them with respect to their handle, whereby the friction developed by the handle is reduced to the minimum, allowing the user to make a longer cast, and reducing the noise and vibration of the handle when the line is playing out.

With these ends in view, my invention consists in a fishing-reel characterized by having a one-handled crank in which the weight is disposed to secure dynamic balance.

My invention further consists in a fishing-reel having certain details of construction as will be hereinafter described and pointed out in the claims.

In carrying out my invention, as herein shown, the reel handle-crank 6 is provided at one end with a handle-grip 7 of any appropriate material of low specific gravity, such as celluloid, and at its opposite end with a metal primary balance-weight 8 secured to it by a screw 9. In order to effect the dynamic balance of the handle, it is further provided with a secondary balance-weight 10 which is applied to the projecting end of the screw 11 by which the handle-grip 7 is secured to the handle-lever 6. Under this arrangement, the secondary weight 10 is located on the opposite side of the handle-crank from the balance-weight 9. The screw 11 is lightened as far as consistent with strength, by being made of aluminum or some corresponding material of low specific gravity. By suitable proportioning the size and weight of the handle-grip 7, primary weight 8, secondary weight 10, and screw 11, I am enabled to bring the centers of gravity of the two arms of the handle-lever into a line perpendicular to the axis of rotation, whereby I secure dynamic balance in the handle and thus reduce its friction to the minimum, as well as noise and vibration, enabling the user to make the longest possible cast and rendering the reel more agreeable to use than reels as hitherto constructed.

To provide clearance for the secondary weight 10 which is located on the inside of the handle-crank 6, I locate the segmental, knurled, thumb-piece 12 of the click mechanism upon the rim of the reel-cap 13, which is provided with a clearance-slot 14 for the passage and clearance of a screw 15 by means of which the said finger-piece is clamped to a friction-plate 16 applied to the inner face of the rim of the cap so as to aline with the finger-piece, as shown in Fig. 4. The friction-plate 16 is formed integral with, and bent at a right angle to, a coupling-arm 17 bearing upon or located close to the inner face of the reel-cap, and formed upon its inner edge with a coupling-flange 18 bent at a right angle to it and having a slot 19 for the reception of a flat, sheet-metal click-spring 20 arranged eccentrically within the reel-cap. This spring is provided at its outer end with an integral arm 21 perforated at 22 for the reception of a screw 23 by means of which it is secured to the inner face of the reel-cap, while its inner end is bent upon itself into U-shape for the production of a square-ended click-arm 24, the end of which coacts with the leaves of a driven-pinion 25 formed upon the adjacent end of the axle 26 of the reel-spool, which consists, as shown, of a sleeve 27 and flanges 28 at the ends thereof.

By pushing the thumb-piece 12 forward, the click-spring 20 is thrown forward so as to engage the square end of its arm 24 with the leaves of the pinion 25, as shown in Fig. 4, while by drawing the thumb-piece 12 rearward, or toward the user of the reel, the click-spring 20 is sprung backward so as to lift the end of the click-arm 24 out of engagement with the leaves of the pinion 25, as shown in Fig. 1.

By constructing the click mechanism as described, the thumb-piece is removed from its customary position upon the outer face of the reel-cap to the rim thereof, where it is nearer the thumb of the user and may be operated with more certainty and more convenience and is, moreover, out of the way of the reel-handle when the same is spinning, so that it may be operated as freely at that time as at any other. My improved construction also enables me to employ a long click-spring reducing the power required for its operation and also increasing its durability in use and lessening the wear upon the leaves of the pinion. Furthermore, by locating the thumb-piece upon the rim of the cap, I am enabled to place the reel-handle closer to the plane of the cap than is otherwise possible, rendering the reel more compact, as well as improving its appearance.

As shown, the handle-lever 6 is mounted upon the outer end of a shaft 29 furnished at its inner end with a large driving-gear 30 meshing into the pinion 25 aforesaid. The frame of the reel consists of right- and left-hand head plates 31 and 32 united by pillars 33, this frame being provided with the usual cross-plate 34 formed integral with two of its pillars 35. The right-hand plate 31 is provided with the usual lightening-cuts 36.

I would have it clearly understood that my improved dynamically balanced handle is not limited in use to the particular fishing-reel herein shown and described.

I claim:

1. A one-handled fishing-reel having a handle, a handle-grip carried thereby, and a balance-weight located on the same side of the axis of rotation of the handle as the said handle-grip.

2. A one-handled fishing-reel having a dynamically balanced handle provided with a handle-grip, a primary balance-weight located on the opposite side of the axis of rotation of the handle, and a secondary balance-weight located in line with the handle-grip, the said three masses, namely, the handle-grip and the two weights, forming a dynamically balanced system with respect to their axes of rotation.

3. A one-handled fishing-reel having a handle-crank, a handle-grip applied thereto, a primary balance-weight applied to the crank on the opposite side of its axis of rotation from the said handle-grip, a secondary balance-weight located in line with the handle-grip, and a screw mounting the handle-crank and of lower specific gravity than either of the said weights.

In testimony whereof, I have signed this specification in the presence of two subscribing witnesses.

JOHN D. ROBERTSON

Witnesses:
ERIK S. PALMER,
A. B. HODGSON.